United States Patent
Choi et al.

(10) Patent No.: US 9,520,983 B2
(45) Date of Patent: Dec. 13, 2016

(54) SYSTEMS FOR DELAY-MATCHED ANALOG SELF-INTERFERENCE CANCELLATION

(71) Applicant: Kumu Networks, Inc., Santa Clara, CA (US)

(72) Inventors: Jung-Il Choi, Santa Clara, CA (US); Mayank Jain, Santa Clara, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 64 days.

(21) Appl. No.: 14/484,094

(22) Filed: Sep. 11, 2014

(65) Prior Publication Data
US 2015/0078217 A1    Mar. 19, 2015

Related U.S. Application Data

(60) Provisional application No. 61/876,663, filed on Sep. 11, 2013.

(51) Int. Cl.
*H04L 5/14* (2006.01)
*H04B 1/525* (2015.01)

(52) U.S. Cl.
CPC ............ *H04L 5/14* (2013.01); *H04B 1/525* (2013.01)

(58) Field of Classification Search
None
See application file for complete search history.

(56) References Cited

U.S. PATENT DOCUMENTS

| | | | |
|---|---|---|---|
| 4,321,624 A | 3/1982 | Gibson et al. | |
| 4,952,193 A | 8/1990 | Talwar | |
| 5,212,827 A | 5/1993 | Meszko et al. | |
| 5,691,978 A * | 11/1997 | Kenworthy | H04B 1/408 370/278 |
| 5,734,967 A | 3/1998 | Kotzin et al. | |
| 5,790,658 A | 8/1998 | Yip et al. | |
| 5,818,385 A | 10/1998 | Bartholomew | |
| 5,930,301 A | 7/1999 | Chester et al. | |
| 6,215,812 B1 | 4/2001 | Young et al. | |

(Continued)

FOREIGN PATENT DOCUMENTS

| | | |
|---|---|---|
| EP | 0755141 B1 | 10/2005 |
| EP | 1959625 B1 | 2/2009 |

(Continued)

OTHER PUBLICATIONS

Bharadia et al., "Full Duplex Radios" SIGOMM, Aug. 12-16, 2013, Hong Kong, China, Copyright 2013 ACM 978-1-4503-2056-6/6/13/08, 12 pages.

*Primary Examiner* — Chirag Shah
*Assistant Examiner* — Suk Jin Kang
(74) *Attorney, Agent, or Firm* — Jeffrey Schox; Thomas Gwinn

(57) ABSTRACT

A system for delay-matched analog self-interference cancellation including a transmit coupler, that samples the analog transmit signal to create a sampled analog transmit signal; a delay matcher that imposes a variable delay on the sampled analog transmit signal to create a delayed analog transmit signal; an analog self-interference canceller that transforms the delayed analog transmit signal to an analog self-interference cancellation signal; and a receive coupler, that combines the analog self-interference cancellation signal with the analog receive signal.

14 Claims, 11 Drawing Sheets

(56) References Cited

U.S. PATENT DOCUMENTS

| | | |
|---|---|---|
| 6,240,150 B1 | 5/2001 | Darveau et al. |
| 6,411,250 B1 | 6/2002 | Oswald et al. |
| 6,539,204 B1 | 3/2003 | Marsh et al. |
| 6,567,649 B2 | 5/2003 | Souissi |
| 6,639,551 B2 | 10/2003 | Li et al. |
| 6,657,950 B1 | 12/2003 | Jones et al. |
| 6,725,017 B2 | 4/2004 | Blount et al. |
| 6,965,657 B1 | 11/2005 | Rezvani et al. |
| 7,336,940 B2 | 2/2008 | Smithson |
| 7,349,505 B2 | 3/2008 | Blount et al. |
| 7,362,257 B2 | 4/2008 | Bruzzone et al. |
| 7,426,242 B2 | 9/2008 | Thesling |
| 7,509,100 B2 | 3/2009 | Toncich |
| 7,869,527 B2 | 1/2011 | Vetter et al. |
| 8,027,642 B2 | 9/2011 | Proctor et al. |
| 8,055,235 B1 | 11/2011 | Gupta et al. |
| 8,060,803 B2 | 11/2011 | Kim |
| 8,086,191 B2 | 12/2011 | Fukuda et al. |
| 8,155,595 B2 | 4/2012 | Sahin et al. |
| 8,175,535 B2 | 5/2012 | Mu |
| 8,179,990 B2 | 5/2012 | Orlik et al. |
| 8,218,697 B2 | 7/2012 | Guess et al. |
| 8,331,477 B2 | 12/2012 | Huang et al. |
| 8,351,533 B2 | 1/2013 | Shrivastava et al. |
| 8,385,871 B2 | 2/2013 | Wyville |
| 8,422,540 B1 | 4/2013 | Negus et al. |
| 8,995,410 B2 | 3/2015 | Balan et al. |
| 9,019,849 B2 | 4/2015 | Hui et al. |
| 9,042,838 B2 | 5/2015 | Braithwaite |
| 9,054,795 B2 | 6/2015 | Choi et al. |
| 9,124,475 B2 | 9/2015 | Li et al. |
| 9,184,902 B2 | 11/2015 | Khojastepour et al. |
| 9,312,895 B1 | 4/2016 | Gupta et al. |
| 2002/0034191 A1 | 3/2002 | Shattil |
| 2002/0064245 A1 | 5/2002 | McCorkle |
| 2002/0172265 A1 | 11/2002 | Kenney |
| 2003/0031279 A1 | 2/2003 | Blount et al. |
| 2003/0099287 A1 | 5/2003 | Arambepola |
| 2003/0104787 A1 | 6/2003 | Blount et al. |
| 2003/0148748 A1 | 8/2003 | Shah |
| 2004/0106381 A1 | 6/2004 | Tiller |
| 2004/0266378 A1 | 12/2004 | Fukamachi et al. |
| 2005/0078743 A1 | 4/2005 | Shohara |
| 2005/0129152 A1 | 6/2005 | Hillstrom |
| 2005/0159128 A1 | 7/2005 | Collins et al. |
| 2005/0190870 A1 | 9/2005 | Blount et al. |
| 2005/0250466 A1 | 11/2005 | Varma et al. |
| 2005/0254555 A1 | 11/2005 | Teague |
| 2005/0282500 A1 | 12/2005 | Wang et al. |
| 2006/0030277 A1 | 2/2006 | Cyr et al. |
| 2006/0058022 A1 | 3/2006 | Webster et al. |
| 2006/0209754 A1 | 9/2006 | Ji et al. |
| 2006/0273853 A1 | 12/2006 | Suzuki et al. |
| 2007/0018722 A1 | 1/2007 | Jaenecke |
| 2007/0249314 A1 | 10/2007 | Sanders et al. |
| 2007/0274372 A1 | 11/2007 | Asai et al. |
| 2008/0037801 A1 | 2/2008 | Alves et al. |
| 2008/0107046 A1 | 5/2008 | Kangasmaa et al. |
| 2008/0111754 A1 | 5/2008 | Osterhues et al. |
| 2008/0131133 A1 | 6/2008 | Blunt et al. |
| 2008/0192636 A1 | 8/2008 | Briscoe et al. |
| 2008/0219377 A1 | 9/2008 | Nisbet |
| 2009/0022089 A1 | 1/2009 | Rudrapatna |
| 2009/0034437 A1 | 2/2009 | Shin et al. |
| 2009/0047914 A1 | 2/2009 | Axness et al. |
| 2009/0180404 A1 | 7/2009 | Jung et al. |
| 2009/0186582 A1* | 7/2009 | Muhammad ............ H04B 1/525 455/63.1 |
| 2009/0303908 A1 | 12/2009 | Deb et al. |
| 2010/0014600 A1 | 1/2010 | Li et al. |
| 2010/0014614 A1 | 1/2010 | Leach et al. |
| 2010/0022201 A1 | 1/2010 | Vandenameele |
| 2010/0056166 A1 | 3/2010 | Tenny |
| 2010/0117693 A1 | 5/2010 | Lorg et al. |
| 2010/0136900 A1 | 6/2010 | Seki |
| 2010/0150033 A1 | 6/2010 | Zinser et al. |
| 2010/0159858 A1 | 6/2010 | Dent et al. |
| 2010/0215124 A1 | 8/2010 | Zeong et al. |
| 2010/0226416 A1 | 9/2010 | Dent et al. |
| 2010/0226448 A1 | 9/2010 | Dent |
| 2010/0232324 A1 | 9/2010 | Radunovic et al. |
| 2010/0279602 A1 | 11/2010 | Larsson et al. |
| 2010/0295716 A1 | 11/2010 | Yamaki et al. |
| 2011/0013684 A1 | 1/2011 | Semenov et al. |
| 2011/0081880 A1 | 4/2011 | Ahn |
| 2011/0149714 A1 | 6/2011 | Rimini et al. |
| 2011/0216813 A1 | 9/2011 | Baldemair et al. |
| 2011/0222631 A1 | 9/2011 | Jong |
| 2011/0243202 A1 | 10/2011 | Lakkis |
| 2011/0250858 A1 | 10/2011 | Jain et al. |
| 2011/0256857 A1* | 10/2011 | Chen .................... H04B 1/525 455/422.1 |
| 2011/0268232 A1 | 11/2011 | Park et al. |
| 2011/0311067 A1 | 12/2011 | Harris et al. |
| 2011/0319044 A1 | 12/2011 | Bornazyan |
| 2012/0021153 A1 | 1/2012 | Bhandari et al. |
| 2012/0063369 A1 | 3/2012 | Lin et al. |
| 2012/0063373 A1 | 3/2012 | Chincholi et al. |
| 2012/0140685 A1 | 6/2012 | Lederer et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0201153 A1 | 8/2012 | Bharadia et al. |
| 2012/0201173 A1 | 8/2012 | Jain et al. |
| 2012/0224497 A1 | 9/2012 | Lindoff et al. |
| 2013/0005284 A1 | 1/2013 | Dalipi |
| 2013/0044791 A1 | 2/2013 | Rimini et al. |
| 2013/0089009 A1 | 4/2013 | Li et al. |
| 2013/0102254 A1 | 4/2013 | Cyzs et al. |
| 2013/0155913 A1 | 6/2013 | Sarca |
| 2013/0166259 A1 | 6/2013 | Weber et al. |
| 2013/0194984 A1* | 8/2013 | Cheng ................ H04W 72/082 370/294 |
| 2013/0215805 A1* | 8/2013 | Hong .................... H04B 15/00 370/281 |
| 2013/0225101 A1 | 8/2013 | Basaran et al. |
| 2013/0253917 A1 | 9/2013 | Schildbach |
| 2013/0259343 A1 | 10/2013 | Liu et al. |
| 2013/0301487 A1 | 11/2013 | Khandani |
| 2013/0301488 A1 | 11/2013 | Hong et al. |
| 2013/0308717 A1 | 11/2013 | Maltsev et al. |
| 2014/0011461 A1 | 1/2014 | Bakalski et al. |
| 2014/0126437 A1 | 5/2014 | Patil et al. |
| 2014/0169236 A1 | 6/2014 | Choi et al. |
| 2014/0185533 A1 | 7/2014 | Haub |
| 2014/0206300 A1 | 7/2014 | Hahn et al. |
| 2014/0219139 A1 | 8/2014 | Choi et al. |
| 2014/0219449 A1 | 8/2014 | Shattil et al. |
| 2014/0348018 A1* | 11/2014 | Bharadia ............... H04L 5/1461 370/252 |
| 2014/0348032 A1 | 11/2014 | Hua et al. |
| 2014/0376416 A1 | 12/2014 | Choi |
| 2015/0156003 A1* | 6/2015 | Khandani ............ H04B 1/525 370/278 |
| 2015/0156004 A1* | 6/2015 | Khandani ............ H04L 5/1423 370/278 |
| 2015/0249444 A1 | 9/2015 | Shin et al. |
| 2015/0303984 A1 | 10/2015 | Braithwaite |

FOREIGN PATENT DOCUMENTS

| | | |
|---|---|---|
| EP | 2267946 A2 | 12/2010 |
| RU | 2256985 C2 | 7/2005 |
| WO | 2013173250 A1 | 11/2013 |
| WO | 2013185106 A1 | 12/2013 |
| WO | 2014093916 A1 | 6/2014 |

\* cited by examiner

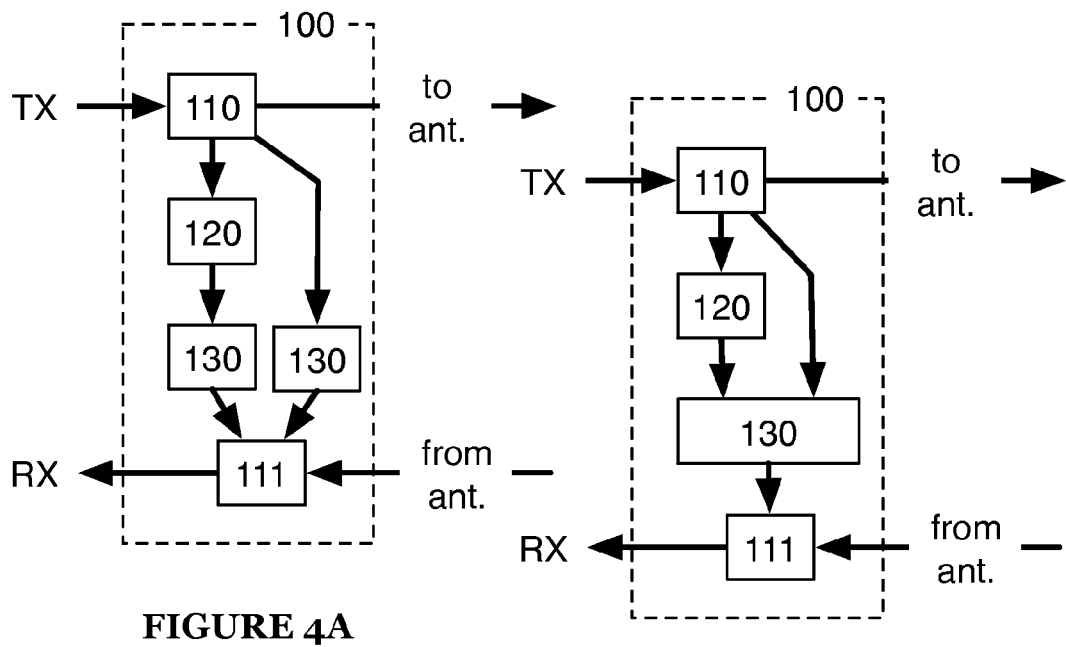
FIGURE 4A
FIGURE 4B
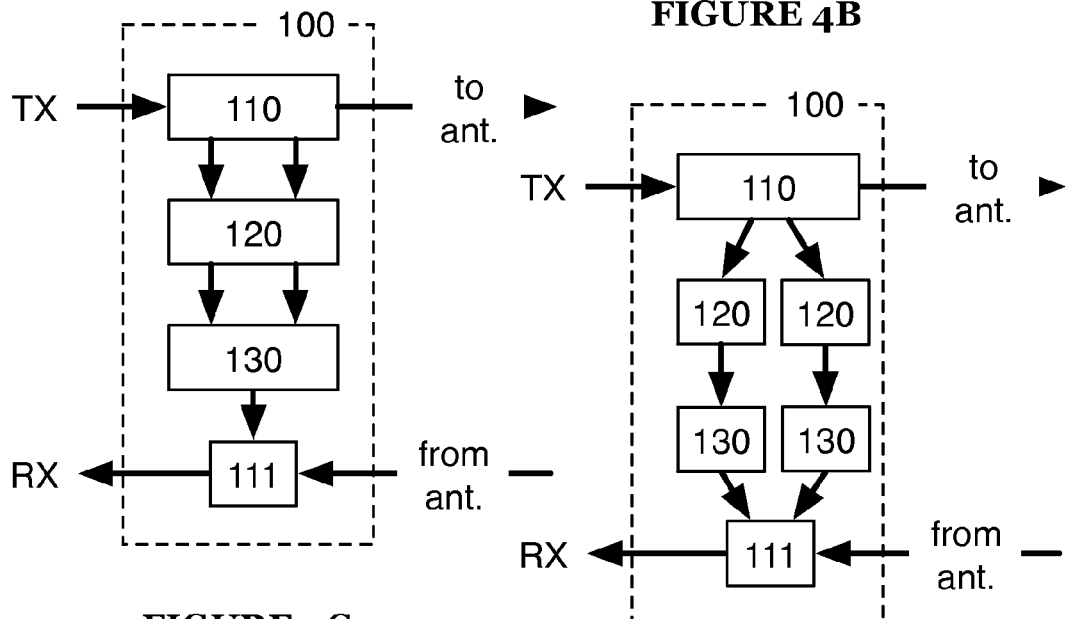
FIGURE 4C
FIGURE 4D

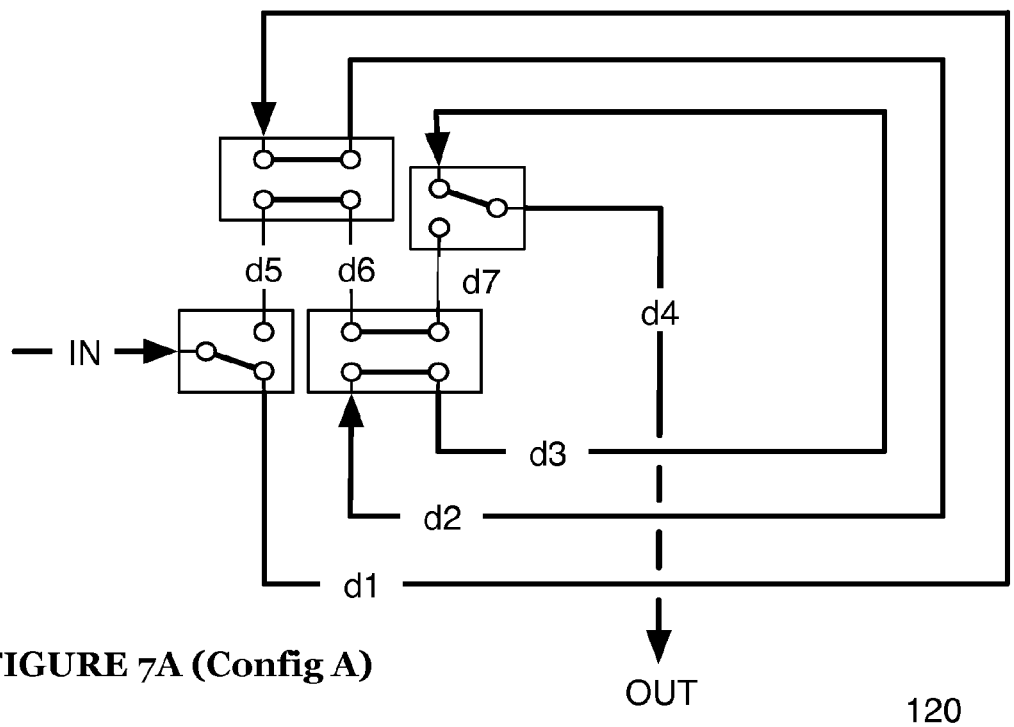
FIGURE 7A (Config A)
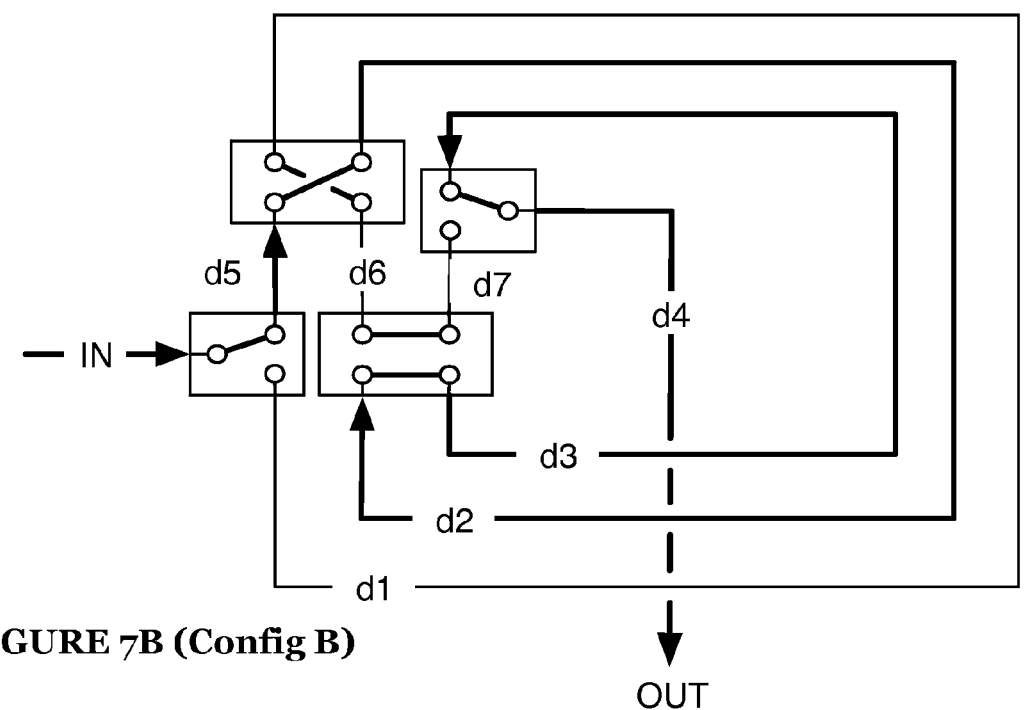
FIGURE 7B (Config B)

SYSTEMS FOR DELAY-MATCHED ANALOG SELF-INTERFERENCE CANCELLATION

CROSS-REFERENCE TO RELATED APPLICATIONS

This application claims the benefit of U.S. Provisional Application Ser. No. 61/876,663, filed on 11 Sep. 2013, which is incorporated in its entirety by this reference.

TECHNICAL FIELD

This invention relates generally to the wireless communications field, and more specifically to new and useful systems for delay-matched analog self-interference cancellation.

BACKGROUND

Traditional wireless communication systems are half-duplex; that is, they are not capable of transmitting and receiving signals simultaneously on a single wireless communications channel. Recent work in the wireless communications field has led to advancements in developing full-duplex wireless communications systems; these systems, if implemented successfully, could provide enormous benefit to the wireless communications field. For example, the use of full-duplex communications by cellular networks could cut spectrum needs in half. One major roadblock to successful implementation of full-duplex communications is the problem of self-interference. While progress has been made in this area, many of the solutions intended to address self-interference fall short in performance, especially in environments where there is high variance in the delay between a signal transmission and reception of self-interference due to that transmission. Thus, there is a need in the wireless communications field to create new and useful systems for delay-matched analog self-interference cancellation.

BRIEF DESCRIPTION OF THE FIGURES

FIGS. 4A, 4B, 4C, and 4D are schematic representations of a system of a preferred embodiment;

FIGS. 7A and 7B are schematic representations of a delay matcher of a system of a preferred embodiment;

DESCRIPTION OF THE PREFERRED EMBODIMENTS

Figure 1:
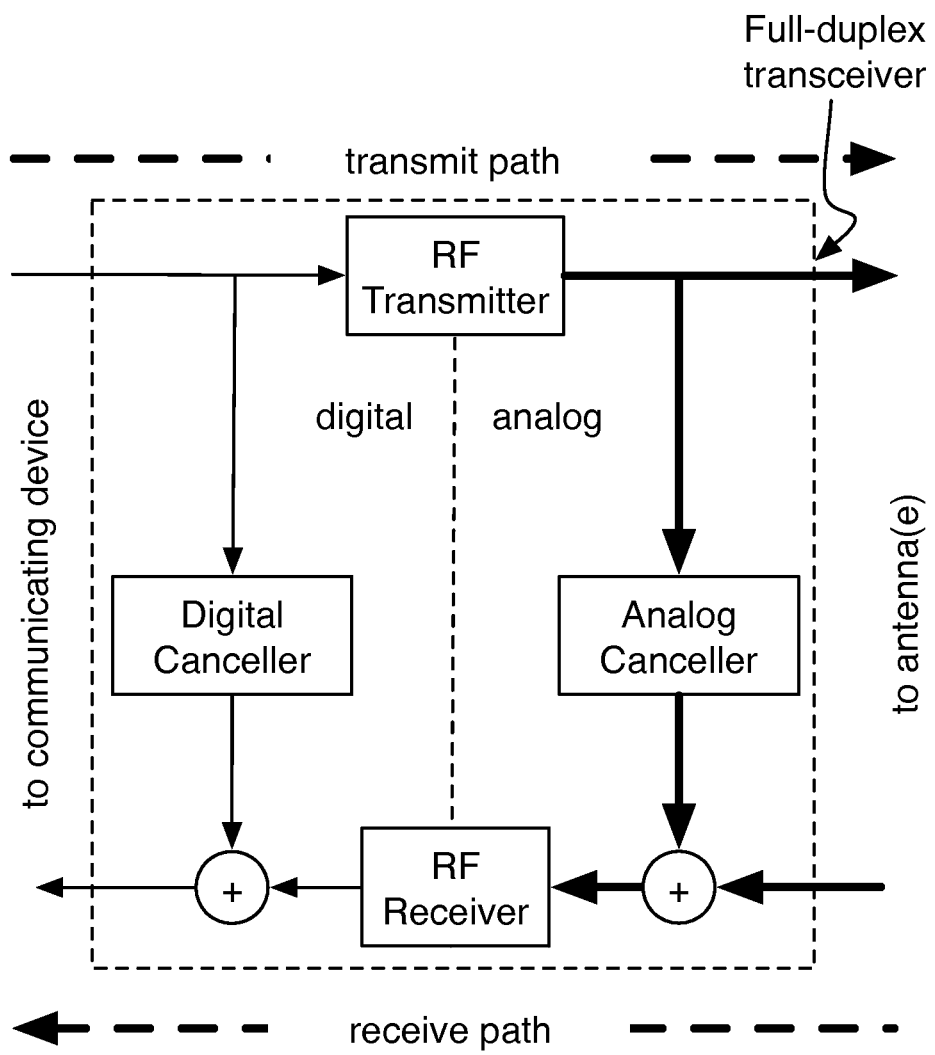
FIG. 1 is a schematic representation of a full-duplex transceiver.

The following description of the preferred embodiments of the invention is not intended to limit the invention to these preferred embodiments, but rather to enable any person skilled in the art to make and use this invention.

1. Full-Duplex Wireless Communication Systems

Wireless communications systems have revolutionized the way the world communicates, and the rapid growth of communication using such systems has provided increased economic and educational opportunity across all regions and industries. Unfortunately, the wireless spectrum required for communication is a finite resource, and the rapid growth in wireless communications has also made the availability of this resource ever scarcer. As a result, spectral efficiency has become increasingly important to wireless communications systems.

One promising solution for increasing spectral efficiency is found in full-duplex wireless communications systems; that is, wireless communications systems that are able to transmit and receive wireless signals at the same time on the same wireless channel. This technology allows for a doubling of spectral efficiency compared to standard half-duplex wireless communications systems.

While full-duplex wireless communications systems have substantial value to the wireless communications field, such systems have been known to face challenges due to self-interference; because reception and transmission occur at the same time on the same channel, the received signal at a full-duplex transceiver may include undesired signal components from the signal being transmitted from that transceiver. As a result, full-duplex wireless communications systems often include analog and/or digital self-interference cancellation circuits to reduce self-interference.

Full-duplex transceivers preferably sample transmission output as baseband digital signals or as radio-frequency (RF) analog signals, but full-duplex transceivers may additionally or alternatively sample transmission output in any suitable manner. This sampled transmission output may be used by full-duplex transceivers to remove interference from received wireless communications data (e.g., as RF analog signals or baseband digital signals). In many full-duplex transceivers, the analog cancellation system functions by summing delayed and scaled versions of the RF transmit signal to create an RF self-interference signal, which is then subtracted from the RF receive signal.

This architecture is generally effective for reducing interference when the delay between a signal transmission and the reception of self-interference components caused by that signal transmission (henceforth referred to as interference delay) is both low in magnitude and in variance. When interference delay is low in both magnitude and variance, it is preferably adapted for by the analog cancellation system; but when interference delays are large or have high variance, the effectiveness of the analog cancellation system may be compromised. The inability to retain high-effectiveness self-interference cancellation in such situations may limit the usefulness of a full-duplex transceiver.

The systems described herein increase the performance of full-duplex transceivers as shown in FIG. 1 (and other applicable systems) by increasing the effectiveness of analog self-interference cancellation in situations where interference delays are above magnitude and/or variance thresholds. Other applicable systems include active sensing systems (e.g., RADAR), wired communications systems, wireless communications systems, and/or any other suitable system, including communications systems where transmit and receive bands are close in frequency, but not overlapping.

2. System for Frequency Independent Analog Self-interference Cancellation

As shown in FIGS. 2, 3A, 3B, 3C, and 3D, a system 100 for delay-matched analog self-interference cancellation includes a transmit coupler 110, a receive coupler 111, a delay matcher 120 and an analog self-interference canceller 130. The system 100 may additionally or alternatively include an amplifier 140.

Figure 2:
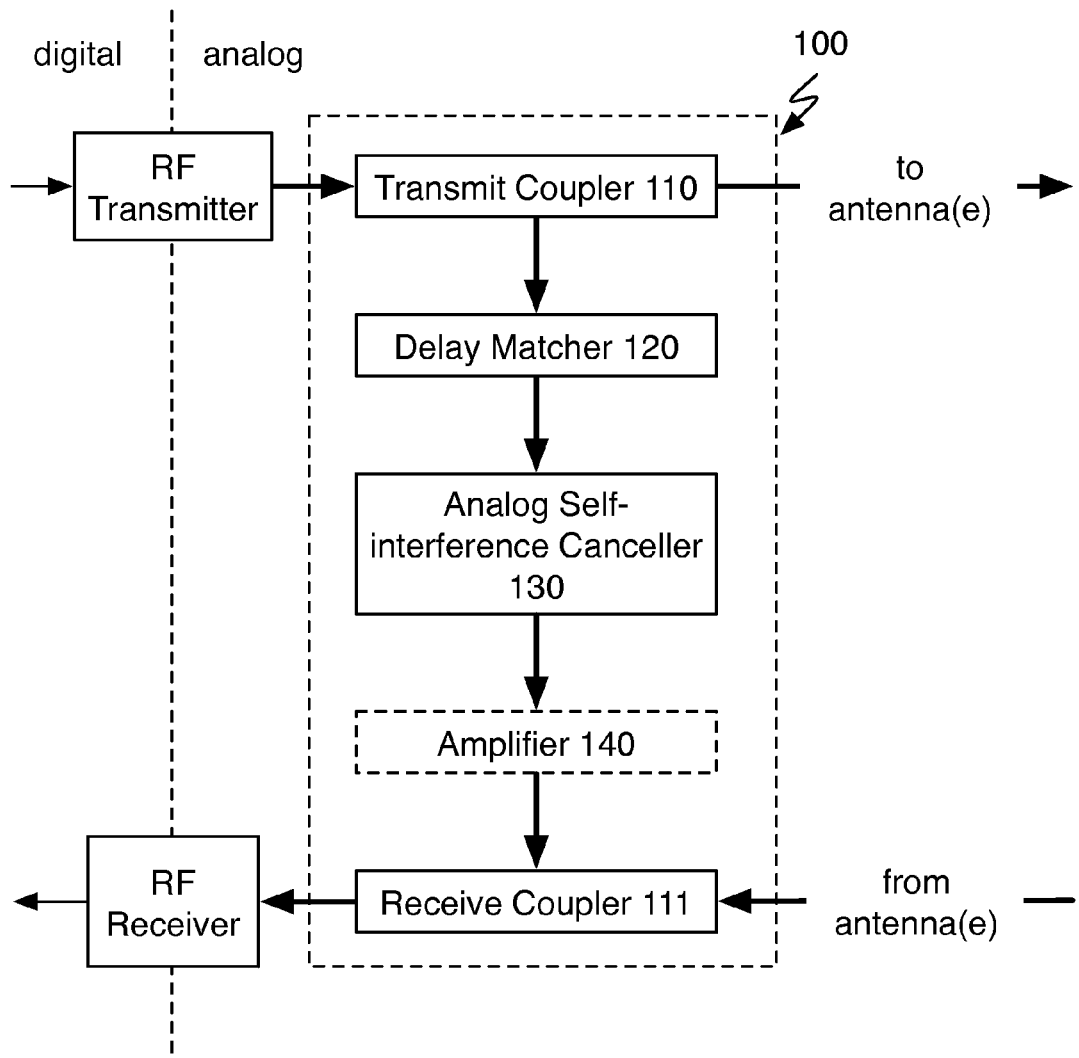
FIG. 2 is a schematic representation of a system of a preferred embodiment.

The system 100 functions to increase the performance of full-duplex transceivers (or other applicable systems) by performing delay-matched analog self-interference cancellation. The system 100 preferably performs delay-matched analog self-interference cancellation by first sampling an analog transmit signal using the transmit coupler 110; the sampled analog transmit signal is then processed through both the delay matcher 120 and the analog self-interference canceller 130 to produce a delay-matched analog self-interference cancellation signal. Finally, the delay-matched analog self-interference cancellation signal is combined with an analog receive signal by the receive coupler 111 to remove self-interference present in the analog receive signal. The system 100 preferably performs delay matching on the sampled transmit signal before generating a self-interference cancellation signal; that is, the output of the delay matcher 120 is coupled to the input of the analog self-interference canceller 130, as shown in FIGS. 2 and 3D. Additionally or alternatively, the system 100 may perform delay matching after the generation of the self-interference cancellation signal (i.e., the output of the canceller 130 is coupled to the input of the delay matcher 120), as shown in FIG. 3C. The delay matcher 120 and analog self-interference canceller 130 are preferably coupled directly, but may additionally or alternatively be coupled indirectly; for example, there may be amplifiers or other circuit components between the delay matcher 120 and the analog self-interference canceller 130.

While the examples mentioned above describe a system 100 with one single input/output delay matcher 120 and one single input/output analog self-interference canceller 130, the system 100 may additionally or alternatively have any number of delay matchers 120 and analog self-interference cancellers 130 having any number of inputs and outputs, as shown in FIGS. 4A, 4B, 4C, and 4D.

Figure 5A:
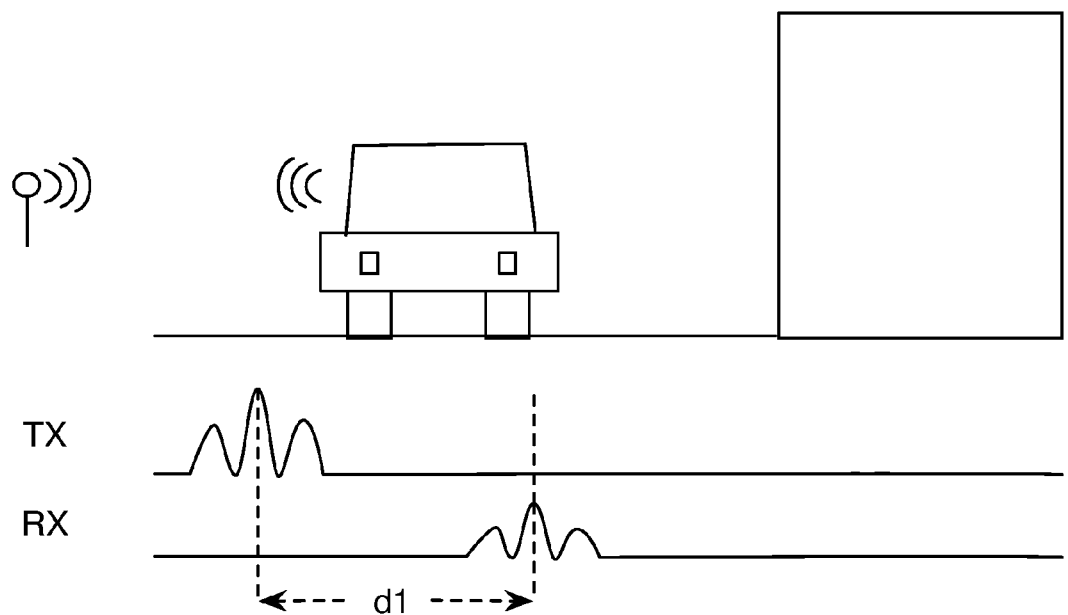
FIGS. 5A and 5B are example representations of self-interference signal delays.
Figure 5B:
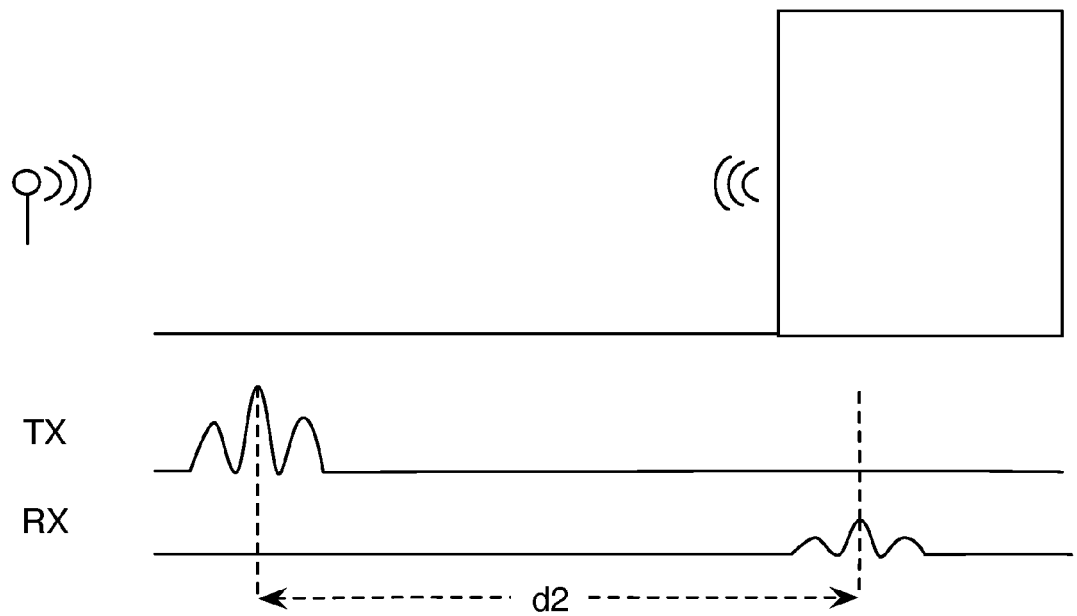

Delay matching and amplitude matching the self-interference cancellation signal to the self-interference signal can aid in self-interference cancellation. For example, a full-duplex wireless communications system having an analog self-interference canceller is placed in an environment where RF reflection characteristics are highly dynamic (for instance, near a street with variable traffic flow) and a significant component of self-interference in receive signals results from reflected transmit signals. The change in environment can therefore result in significantly varied delay and attenuation of the self-interference component in the receive signal, as shown in FIGS. 5A and 5B. When a car is present, the primary reflective component of received self-interference might be a reflection from the car (as shown in FIG. 5A); however, when a car is not present, the primary reflective component of received self-interference might be a reflection from a nearby building (as shown in FIG. 5B). The reflection from the car in this example results in a shorter delay and higher amplitude than the reflection from the building. Even if the waveform of the self-interference component is not significantly difficult, this change in delay and amplitude may significantly affect the receive signal.

Though it is possible to handle delay and amplitude matching in the analog self-interference canceller, it may be expensive or prohibitively difficult to create an analog self-interference canceller with the range to perform both very fine and very coarse delay adjustments (very fine adjustments being used to generate the self-interference cancellation waveform, and very coarse adjustments being used to appropriately delay the self-interference cancellation waveform to match reflection delays or other delays).

Performing delay matching using the delay matcher 120 instead of relying on individual delay matching components in the analog self-interference canceller 130 allows the system 100 to perform both very fine and very coarse delay adjustments without requiring multiple expensive or large delay matching circuits within the self-interference canceller 130. Additionally or alternatively, the use of the delay matcher 120 may allow the analog self-interference canceller 130 to use fixed delays, further reducing complexity/expense.

Figure 3A:
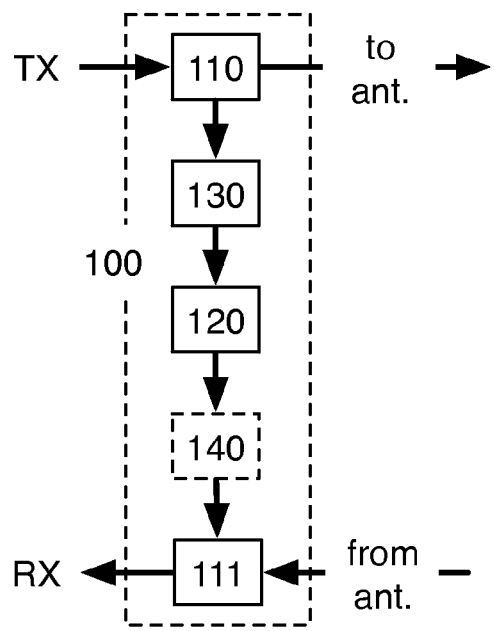
FIGS. 3A, 3B, 3C, and 3D are schematic representations of a system of a preferred embodiment.
Figure 3B:
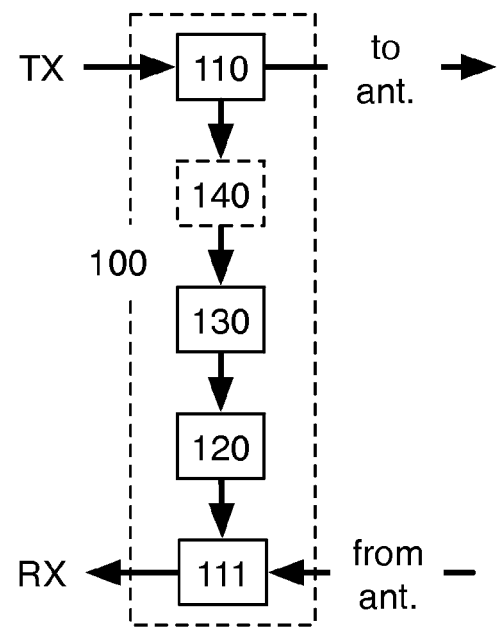
Figure 3C:
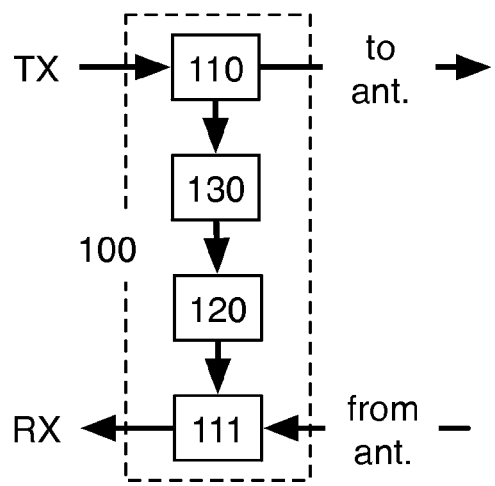
Figure 3D:
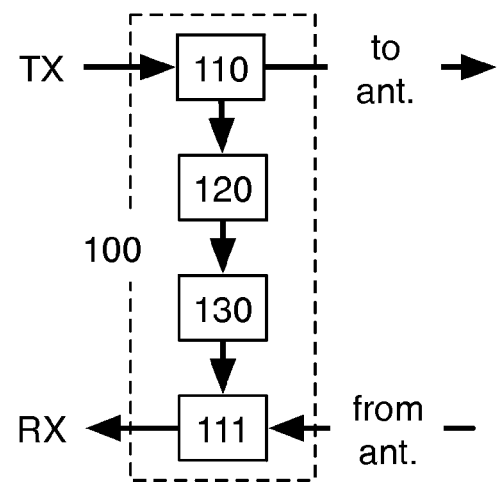

The system 100 may additionally or alternatively include an amplifier 140, as shown in FIGS. 3A and 3B. The amplifier 140 functions to amplify the self-interference cancellation signal before combination with the analog receive signal. The amplifier 140 is preferably coupled to the output of the analog self-interference canceller 130 as shown in FIG. 2. Additionally or alternatively, the delay matcher 120, analog self-interference canceller 130, and amplifier 140 may be coupled in any suitable manner; the configurations as shown in FIGS. 2, 3A and 3B form only a subset of possible configurations. The amplifier 140 preferably functions as an amplitude matcher; that is, the amplifier 140 preferably serves to match the amplitude of the generated self-interference cancellation signal to the amplitude of the self-interference signal, increasing the amount of self-interference removed by the self-interference cancellation signal. Additionally or alternatively, the amplifier 140 may be used to amplify the self-interference cancellation signal for any other suitable purpose.

The system 100 is preferably implemented using analog integrated circuits (ICs) but may additionally or alternatively be implemented using discrete components (e.g., capacitors, resistors, transistors), wires, transmission lines, waveguides, digital components, mixed-signal components, or any other suitable components.

Figure 6A:
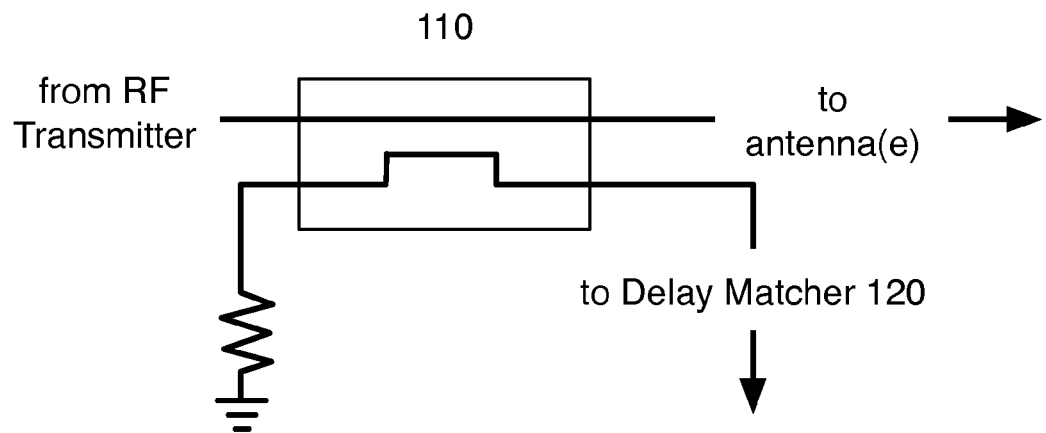
FIG. 6A is a schematic representation of a transmit coupler of a system of a preferred embodiment.

The transmit coupler 110, as shown in FIG. 6A, functions to provide a sample of an RF transmit signal of a full-duplex radio to the system 100. The transmit coupler 110 input is preferably coupled directly to an RF transmitter of the full-duplex radio, but may additionally or alternatively be coupled indirectly to the RF transmitter and/or be coupled to another suitable RF transmission source. The transmit coupler no preferably has two outputs, one coupled to antenna (e) of the full-duplex radio (directly or indirectly) and another coupled to one or more of the delay matcher 120, the analog self-interference canceller 130, and the amplifier 140. The transmit coupler no preferably routes the majority of input power to the antenna(e) output port, but may additionally or alternatively route power in any suitable manner (e.g., routing the majority of power to the other output port). The transmit coupler no may have any number of input and output ports, including bidirectional input/output ports.

The transmit coupler 110 is preferably a short section directional transmission line coupler, but may additionally or alternatively be any power divider, power combiner, directional coupler, or other type of signal splitter suitable for coupling an RF transmit line of a full-duplex radio to the system 100. The transmit coupler 110 is preferably a passive coupler, but may additionally or alternatively be an active coupler (for instance, including power amplifiers). For example, the transmit coupler no may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler. The output ports of the transmit coupler 110 are preferably phase-shifted by ninety degrees, but may additionally or alternatively be in phase or phase shifted by a different amount.

Figure 6B:
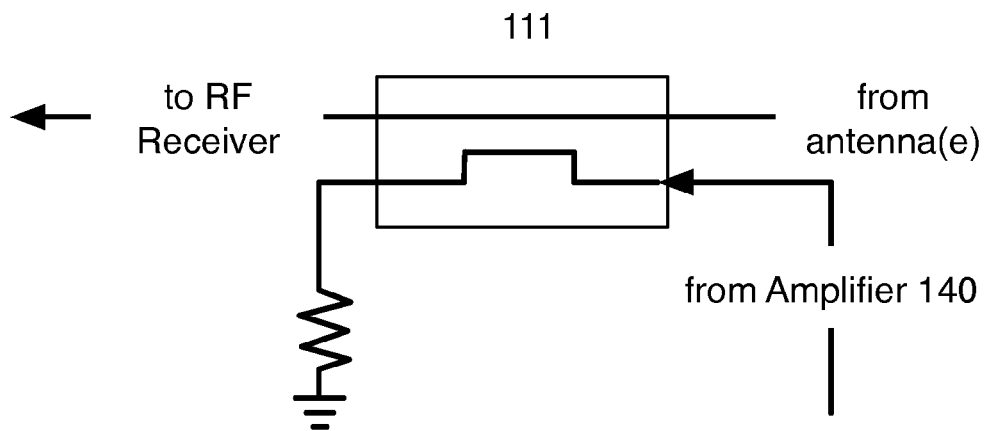
FIG. 6B is a schematic representation of a receive coupler of a system of a preferred embodiment.

The receive coupler 111, as shown in FIG. 6B, functions to couple the analog self-interference cancellation signal generated by the system 100 to the RF receive signal of the full-duplex radio. The receive coupler 111 output is preferably coupled directly to an RF receiver of the full-duplex radio, but may additionally or alternatively be coupled indirectly to the RF receiver and/or be coupled to another suitable RF receiver. The receive coupler 111 preferably has two inputs, one coupled to antenna(e) of the full-duplex radio (directly or indirectly) and another coupled to one or more of the delay matcher 120, the analog self-interference canceller 130, and the amplifier 140. The receive coupler 111 preferably couples the majority of power from both input ports to the RF receiver output port; this coupling preferably results in the RF receiver output port outputting a sum of the self-interference cancellation signal (generated by the system 100 and the RF receive signal (received at the antenna (e)). Additionally or alternatively, the receive coupler 111 may couple or route power in any suitable manner. The receiver coupler 111 may have any number of input and output ports, including bidirectional input/output ports.

The receive coupler is preferably a short section directional transmission line coupler, but may additionally or alternatively be any power divider, power combiner, directional coupler, or other type of signal splitter suitable for coupling the self-interference cancellation signal generated by the system 100 to an RF receive signal of a full-duplex radio. The receive coupler 111 is preferably a passive coupler, but may additionally or alternatively be an active coupler (for instance, including power amplifiers). For example, the receive coupler 111 may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler. The input ports of the receive coupler 111 are preferably phase-shifted ninety degrees from each other, but may additionally or alternatively be phase-shifted by any suitable amount to correct for phase offsets (or any other suitable reason). The input ports of the receive coupler 111 may additionally or alternatively not be phase-shifted.

The transmit coupler 110 and receive coupler 111 preferably connect to a single antenna of the full duplex radio through a duplexer or circulator, but may additionally or alternatively connect to multiple antennae. In one example, the transmit coupler 110 and receive coupler 111 connect to two separate antennae (e.g., a transmit antenna and a receive antenna); in another example, the transmit coupler 110 and receive coupler 111 both connect to the same two antennae. The transmit coupler 110 and receive coupler 111 may additionally or alternatively connect to any suitable RF transmit and RF receive sources (e.g., an RF signal transmitted solely over coaxial cable). There may additionally or alternatively be filters, power amplifiers, and/or any other RF signal modifying components between the couplers 110, 111, and antennae.

Figure 8:
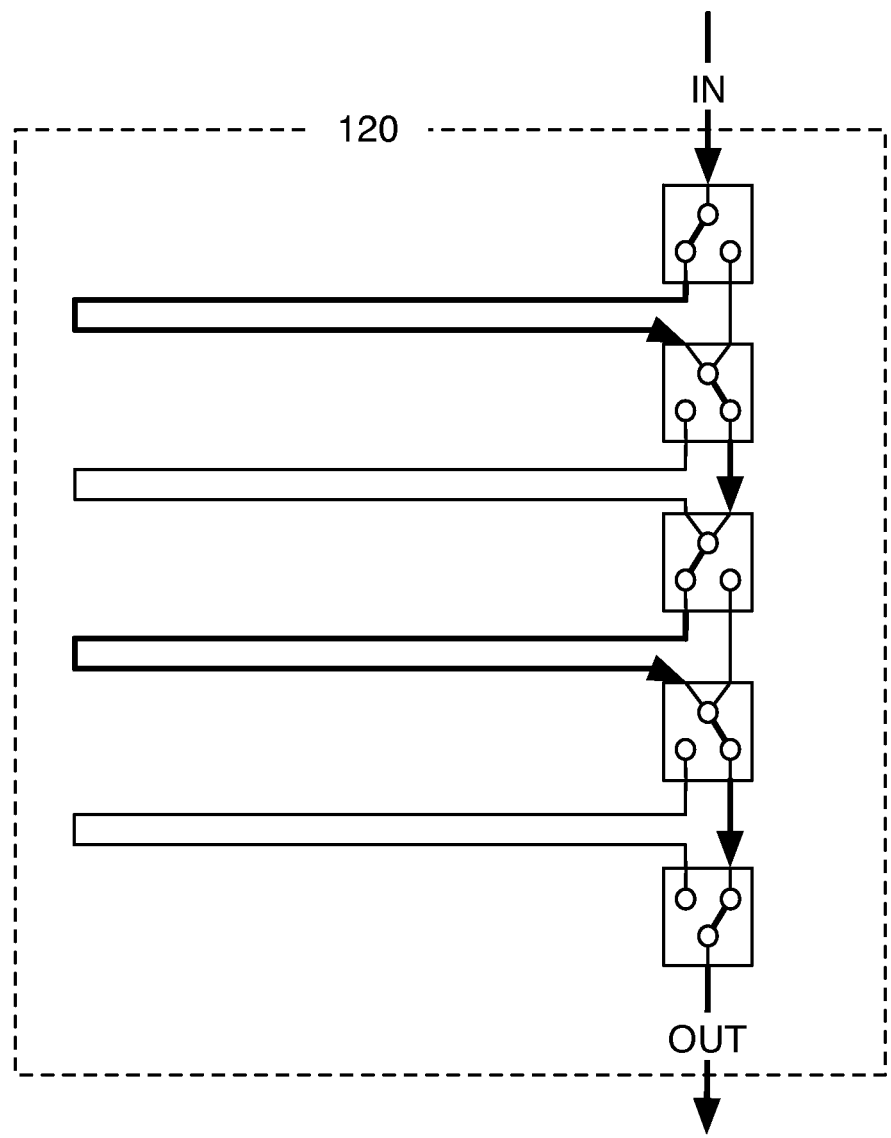
FIG. 8 is a schematic representation of a delay matcher of a system of a preferred embodiment.

The delay matcher 120, as shown in FIGS. 7A and 7B, functions to delay the self-interference cancellation signal generated by the analog self-interference canceller 130 in order to delay-match the cancellation signal with self-interference cancellation signal components in signals received by the system 100. The delay matcher 120 is preferably a variable delay circuit with concentric traces as described below, but may additionally or alternatively be any suitable variable delay circuit. For example, the delay matcher 120 may be an op-amp based variable delay circuit, or a linear delay line circuit, as shown FIG. 8.

The delay matcher 120 preferably causes signals entering the input port to experience a variable delay before exiting the output port. The variable delay is preferably set by an external control circuit of the system 100, but may additionally or alternatively be set in any suitable manner (e.g., manually controlled switches set by hand, electronic switches controlled by software, etc.). The delay matcher 120 preferably includes a series of delay lines (e.g., concentric metal traces) connected via switches that reconfigure how the delay lines are connected. Each delay line preferably has a set and characteristic delay; additionally or alternatively, delay lines may have variable delays.

For example, a delay matcher 120 may have 7 delay lines connected by four switches (two SPST, two DPDT) as shown in FIGS. 7A and 7B; each delay line having a characteristic delay. Delay line 1 has a delay of d1, delay line 2 has a delay of d2, and so on. By controlling the positions of the switches (i.e., setting a configuration state of the delay matcher 120), the delay matcher 120 may control the total delay. A first configuration might result in a delay of $d_A=d_1+d_2+d_3+d_4$, as shown in FIG. 7A. A second configuration might result in a delay of $d_B=d_5+d_2+d_3+d_4$. In the case of concentric metal traces, the delay may be linearly proportional to the length of the line; thus, $d_1>d_5 \rightarrow d_A>d_B$.

The delay matcher 120 is preferably a passive circuit, but may additionally or alternatively be an active circuit (e.g., the delay matcher 120 may include amplification).

If the delay matcher 120 is implemented using a set of nearby metallic traces, the delay matcher 120 may include isolating mechanisms to reduce crosstalk between the metallic traces. For example, the delay matcher 120 may include insulating material covering the traces (e.g., an insulating cap or deposited layers) to improve isolation between the traces. An insulating cap may have grooves with dimensions matching the dimensions of the corresponding metal traces so as to enclose the metal traces when placed over the variable delay circuit.

Figure 9:
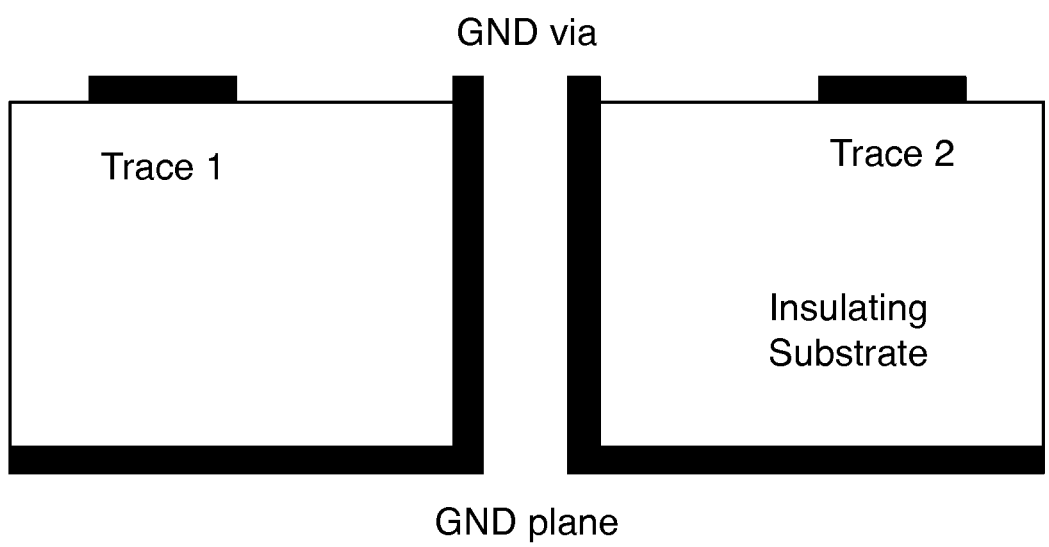
FIG. 9 is a schematic representation of a delay matcher of a system of a preferred embodiment.
Figure 10:
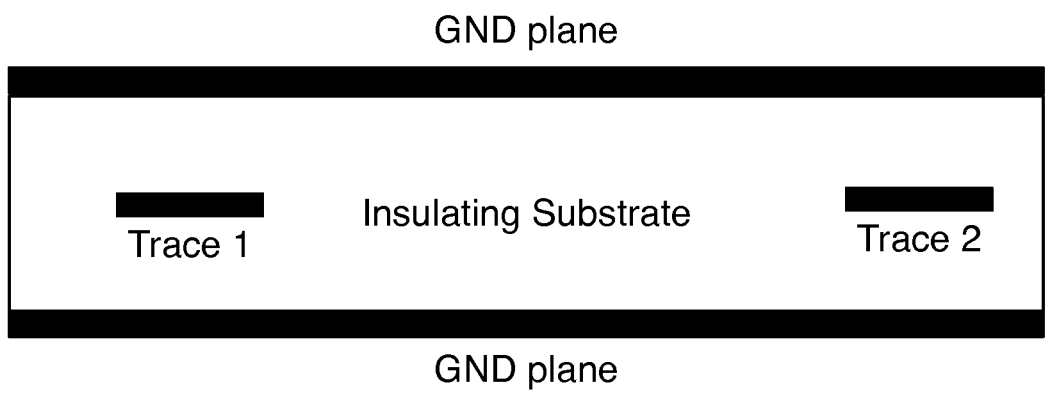
FIG. 10 is a schematic representation of a delay matcher of a system of a preferred embodiment.

In a variation of a preferred embodiment, the delay matcher 120 may include ground vias to increase electrical isolation between metallic traces, as shown in FIG. 9. In another variation of a preferred embodiment, the delay matcher 120 may be implemented as a stripline structure; in this structure the metallic delay lines are sandwiched between two or more ground planes, as shown in FIG. 10.

The analog self-interference canceller 130 functions to produce an analog self-interference cancellation signal from the analog transmit signal that can be combined with the analog receive signal to reduce self-interference present in the analog receive signal. The analog self-interference canceller 130 is preferably designed to operate at a single RF frequency band, but may additionally or alternatively be designed to operate at multiple RF frequency bands. Designing the analog self-interference canceller 130 to operate at a single RF frequency band may reduce design compromises that may be made when designing for multiple frequency bands.

The analog self-interference canceller 130 is preferably implemented as an analog circuit that transforms an analog transmit signal into an analog self-interference cancellation signal by combining a set of filtered, scaled, and/or delayed versions of the analog transmit signal, but may additionally or alternatively be implemented as any suitable circuit. For instance, the analog self-interference canceller 130 may perform a transformation involving only a single version or copy of the analog transmit signal. The transformed signal (the analog self-interference cancellation signal) preferably represents at least a part of the self-interference component received at the RF receiver of a full-duplex radio.

The analog self-interference canceller 130 is preferably adaptable to changing self-interference parameters in addition to changes in the analog transmit signal; for example, RF transceiver temperature, ambient temperature, antenna configuration, humidity, and RF transmitter power. Adaptation of the analog self-interference canceller 130 is preferably performed by a control circuit or other control mechanism included in the canceller 130, but may additionally or alternatively be performed by any suitable controller.

Figure 11:
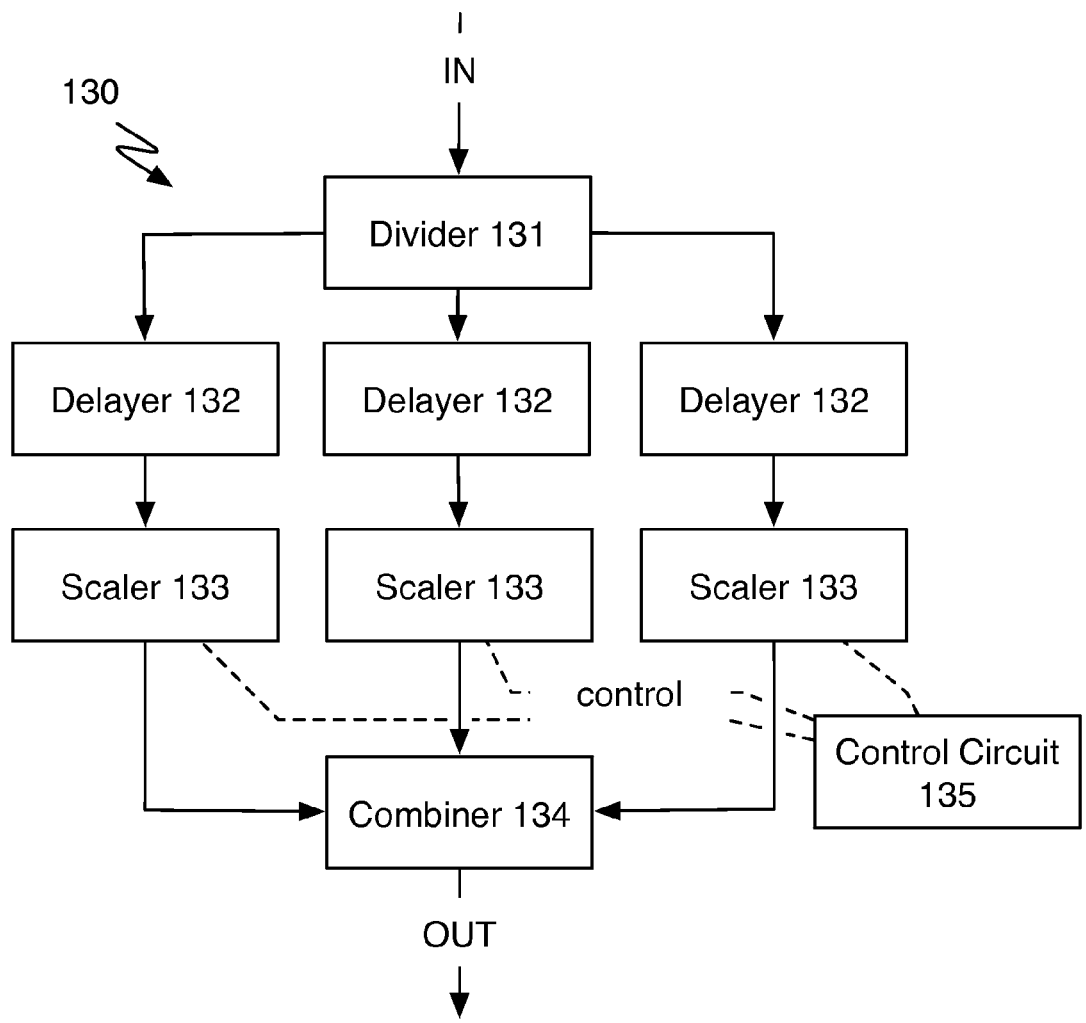
FIG. 11 is a schematic representation of an analog self-interference canceller of a system of a preferred embodiment.

In one implementation of the preferred embodiment, the analog self-interference canceller 130 includes a signal divider 131, delayers 132, scalers 133, a signal combiner 134 and a control circuit 135, as shown in FIG. 11. In this implementation, the analog self-interference canceller 130 splits the analog transmit signal into multiple signal paths using the signal divider 131 and transforms each signal path individually before recombining them at the signal combiner 134. The analog self-interference canceller 130 preferably transforms each signal path by delaying (with the delayer 132) and scaling (with the scaler 133) signal components on each signal path.

In one implementation of the analog self-interference controller 130, the divider 131 output is coupled to the scaler 133 inputs and the scaler 133 outputs are coupled to the delayer 132 inputs. In a second implementation, the divider 131 output is coupled to the delayer 132 inputs, and the delayer 132 outputs are coupled to the scaler 133 inputs. The components of the analog self-interference controller 130 may be coupled in any manner that enables analog self-interference cancellation for the system 100.

In one implementation of the analog self-interference controller 130, each signal path includes both a scaler 133 and a delayer 132; in an alternate implementation, signal paths may include only one of a scaler 133 and a delayer 132 or neither.

The signal divider 131 functions to split the analog transmit signal into multiple transmit signal paths. The signal divider 131 preferably splits the analog transmit signal into multiple analog transmit signals having substantially the same waveform as the input analog transmit signal and equal power; the signal divider 131 may additionally or alternatively split the analog transmit signal into multiple analog transmit signals having different power levels and/or containing different waveforms than the input analog transmit signal. The signal divider 131 is preferably a transmission line power divider, but may additionally or alternatively be any suitable power divider, splitter, or coupler. The signal divider 131 may additionally contain any suitable electronics for pre-processing the analog transmit signal; for example, the signal divider 131 may contain an amplifier to increase the power contained in one or more of the output analog transmit signals.

The delayers 132 function to delay analog transmit signal components. The delay introduced by each delayer 132 (also referred to as a delayer delay) is preferably fixed (i.e., the delayer 132 is a fixed delayer), but delayers 132 may additionally or alternatively introduce variable delays. The delayer 132 is preferably implemented as an analog delay circuit (e.g., a bucket-brigade device, a long transmission line, a series of RC networks) but may additionally or alternatively be implemented in any other suitable manner. If the delayer 132 is a variable delayer, the delay introduced is preferably set by the control circuit 135, but may additionally or alternatively be set in any suitable manner.

The scalers 133 function to scale analog transmit signal components; specifically, the scalers 133 effectively multiply the analog transmit signal components by a scale factor. For example, an attenuation of 34% might be represented as a scale factor of 0.66; a gain of 20% might be represented as a scale factor of 1.20; and an attenuation of 10% and a phase inversion might be represented as a scale factor of −0.90. The scalers 133 provide the weighting for the combination of analog self-interference components at the signal combiner 134 (e.g., a signal with scale factor 2 is weighted twice as heavily as one with a scale factor of 1).

The scalers 133 may include attenuators, amplifiers, phase inverters, and/or any other suitable components for scaling IF transmit signal components. Attenuators may be resistive attenuators (T pad, Pi pad), amplifiers with less than unity gain, or any other suitable type of attenuator. Amplifiers may be transistor amplifiers, vacuum tube amplifiers, op-amps, or any other suitable type of amplifier. Phase inverters may be any phase inversion devices, including NPN/PNP phase inversion circuits and/or inverting amplifiers.

The scalers 133 preferably are capable of attenuation, gain, and phase inversion, but may alternatively be capable only of a subset of said capabilities. Each scaler 133 preferably includes all three capabilities in a single device (e.g., an amplifier with tunable gain and two outputs, one inverted and one non-inverted) but may additionally or alternatively separate capabilities into different sections (e.g., an amplifier with tunable gain but no inversion capability, along with a separate phase inversion circuit). The scalers 133 are preferably controlled by the control circuit 135, but may additionally or alternatively be controlled in any suitable manner. The control circuit 135 preferably controls scalers 133 by dynamically setting scale factors for each scaler 133, but may additionally or alternatively control scalers 133 in any suitable manner.

After transformation by a scaler 133 and/or a delayer 132, analog transmit signal components are transformed into analog self-interference cancellation signal components, which may be combined to form an analog self-interference cancellation signal.

The signal combiner 134 functions to combine the analog self-interference cancellation signal components into an analog self-interference cancellation signal; the analog self-interference cancellation signal may then be combined with an analog receive signal to remove self-interference. The signal combiner 134 preferable combines analog self-interference cancellation signal components (resulting from multiple signal paths) and outputs the resulting analog self-interference cancellation signal. The signal combiner 134 is preferably a transmission line coupler, but may additionally or alternatively be any suitable type of coupler (described in the receive coupler in and transmit coupler 110 sections).

The signal combiner 134 may additionally contain any suitable electronics for post-processing the analog self-interference cancellation signal before outputting it; for example, the signal combiner 134 may contain an amplifier to increase the power of the analog self-interference cancellation signal.

The control circuit 135 functions to control the configuration parameters of the analog self-interference canceller 130; these variable settings may include pre-processing settings (at the signal divider 131), scale factor (at the scalers 133), delay (at the delayers 132), post-processing settings (at the signal combiner 134) and/or any other suitable variable settings. The control circuit 135 preferably controls scaler 133 scale factors (including gain/attenuation/phase inversion), to create an analog self-interference cancellation signal that reflects some or all of the self-interference contained within an RF receive signal of the full-duplex radio.

The control circuit 135 preferably sets the configuration state of the analog self-interference canceller 130 (where the state includes settings for each variable setting controlled by the control circuit 135) based upon the received analog transmit signal, but may additionally or alternatively set the configuration state based on any other suitable input. Suitable input may include signal data (e.g., analog transmit signal, digital transmit signal, analog receive signal), full-duplex radio settings (e.g., RF transmitter power, antenna position), full-duplex radio characteristics (e.g., receiver operating characteristics, transmitter operating characteristics), environmental data (e.g., transceiver temperature, ambient temperature, ambient humidity), and/or any other input relating to self-interference present in the analog receive signal.

The control circuit 135 preferably sets configuration states based on an algorithm responsive to input. This may include a state-choosing algorithm that selects from a set of pre-chosen states based on some input parameter set, a dynamic algorithm that generates states based on the input parameter set (as opposed to choosing from a limited state set), or any other suitable algorithm. Additionally or alternatively, the control circuit 135 may set configuration states in any suitable manner.

The control circuit 135 may adapt configuration states and/or configuration state generating/choosing algorithms using analytical methods, online gradient-descent methods (e.g., LMS, RLMS), and/or any other suitable methods. The control circuit 135 may additionally or alternatively adapt configuration states and/or configuration state generating/choosing algorithms based on test input scenarios (e.g., scenarios when the signal received by the RF receiver is known), scenarios where there is no input (e.g., the only signal received at the RF receiver is the signal transmitted by the RF transmitter), or scenarios where the received signal is unknown. In cases where the received signal is an unknown signal, the control circuit 135 may perform adaptation based on historical received data (e.g., what the signal looked like ten seconds ago) or any other suitable information. The control circuit 135 may additionally or alternatively perform adaptation based on the content of the analog transmit signals; for instance, if the analog transmit signal is modulated in a particular way, the control circuit 135 may perform adaptation such that when the analog self-interference signal is combined with the analog receive signal the detected modulation (as an indicator of self-interference) is reduced.

The control circuit 135 is preferably implemented as a programmable digital circuit, but may additionally or alternatively be implemented in any suitable digital or analog circuit, including implementation as software in a general purpose computing device.

In a variation of a preferred embodiment, the control circuit 135 also controls the delay matcher 120 and/or the amplifier 140 using techniques substantially similar to those described above.

The amplifier 140 functions to amplify the self-interference cancellation signal before combination with the analog receive signal. The amplifier 140 is preferably an analog-based power amplifier circuit, but may additionally or alternatively be any suitable circuit. The amplifier 140 may be a standalone amplifier, but may additionally or alternatively be integrated into other components of the system 100 (e.g., the delay matcher 120 or the analog self-interference canceller 130).

As a person skilled in the art will recognize from the previous detailed description and from the figures and claims, modifications and changes can be made to the preferred embodiments of the invention without departing from the scope of this invention defined in the following claims.

We claim:

1. A system for delay-matched analog self-interference cancellation comprising:
   a transmit coupler, communicatively coupled to an RF transmit signal of a full-duplex wireless communication system, that samples the RF transmit signal to create a sampled RF transmit signal;
   a delay matcher, comprising concentric metal delay lines coupled by switches, that imposes a variable delay on the sampled RF transmit signal to create a delayed RF transmit signal; wherein the variable delay is a function of delay line lengths and switch positions;
   an analog self-interference canceller, comprising a signal divider, first and second delayers, first and second scalers, and a signal combiner, wherein the signal divider splits the delayed RF transmit signal into first and second transmit signal components, the first scaler and first delayer scale and delay the first transmit signal component to create a first self-interference cancellation signal component, the second scaler and second delayer scale and delay the second transmit signal component to create a second self-interference cancellation signal component, and the signal combiner combines the first and second self-interference cancellation signal components to form an RF self-interference cancellation signal;
   an amplifier, that amplifies the RF self-interference cancellation signal; and
   a receive coupler, communicatively coupled to an RF receive signal of the full-duplex wireless communication system, that combines the RF self-interference cancellation signal with the RF receive signal.

2. The system of claim 1, further comprising an analog self-interference canceller control circuit that adapts configuration parameters of the analog self-interference canceller based on at least one of transmit signal data, receive signal data, and environmental data.

3. The system of claim 2, wherein configuration parameters comprise scaler scale factors.

4. A system for delay-matched analog self-interference cancellation comprising:
   a transmit coupler, communicatively coupled to an analog transmit signal of a communication system, that samples the analog transmit signal to create a sampled analog transmit signal;

a delay matcher, comprising a set of conductive delay lines and a set of switches, wherein the delay matcher imposes a variable delay on the sampled analog transmit signal to create a coarsely delayed analog transmit signal; wherein the set of switches controls signal routing between a delay matcher input and a delay matcher output, and thus sets the variable delay; and an analog self-interference canceller, comprising a signal divider, a set of scalers and delayers, and a signal combiner; wherein the analog self-interference canceller passes the coarsely delayed analog transmit signal through the signal divider to produce a set of transmit signal components; wherein the analog self-interference canceller passes the set of transmit signal components through at least a subset of the set of scalers and delayers to create a set of self-interference cancellation signal components; wherein the analog self-interference canceller passes the self-interference cancellation signal components through the signal combiner to produce an analog self-interference cancellation signal; and a receive coupler, communicatively coupled to an analog receive signal of the communication system, that combines the analog self-interference cancellation signal with the analog receive signal.

5. The system of claim 4, further comprising a control circuit that sets a configuration state of the analog self-interference canceller in response to at least one of sampled signal data, communication system settings, communication system characteristics, and environmental data.

6. The system of claim 5, wherein the control circuit adapts the configuration state based on at least one of historical received data, RF transmit signal content, and a test signal.

7. The system of claim 4, wherein each scaler of the set of scalers and delayers comprises an attenuator.

8. The system of claim 4, wherein the set of conductive delay lines comprises a set of concentric metal delay lines.

9. The system of claim 8, wherein the delay matcher is fabricated on a printed circuit board.

10. The system of claim 9, wherein the delay matcher further comprises ground vias positioned between metal delay lines of the set of concentric metal delay lines.

11. The system of claim 9, wherein the delay matcher is fabricated in a stripline structure.

12. The system of claim 8, further comprising a control circuit that sets a configuration state of the analog self-interference canceller in response to at least one of sampled signal data, communication system settings, communication system characteristics, and environmental data.

13. The system of claim 12, wherein the control circuit also sets the variable delay by controlling switch positions of the set of switches.

14. The system of claim 13, wherein the control circuit sets the variable delay in response to at least one of sampled signal data, communication system settings, communication system characteristics, and environmental data.

* * * * *